Sept. 21, 1965

R. F. LONG 3,207,327

CONCRETE BATCH PLANT

Filed Nov. 29, 1962

INVENTOR.
RUSSELL F. LONG.
BY
Willard S. Grout
ATTORNEY.

INVENTOR.
RUSSELL F. LONG.
BY
Willard S. Grund
ATTORNEY.

3,207,327
CONCRETE BATCH PLANT
Russell F. Long, 1045 W. Maryland Ave., Phoenix, Ariz.
Filed Nov. 29, 1962, Ser. No. 240,854
3 Claims. (Cl. 214—2)

This invention pertains to improvements in concrete batch plants adapted to mix aggregate, sand and cement in proper proportions at a job site.

There are many different makes of portable concrete batch plants but despite their minor differences they all collect materials in a stationary weigh hopper. Some add materials to the hopper until a pre-set weight is reached; others fill it and discharge a pre-set amount by utilizing decumulative type scales which come into balance when the preset amount has been discharged.

Material to charge the weigh hoppers may be transferred directly by means of a front-end loader or may be discharged from overhead storage bins which have previously been filled by a clam bucket or belt conveyor.

The use of overhead storage for a portable plant is a cumbersome and expensive arrangement, while the dumping of a precise amount from a front-end loader is a slow and tedious method of questionable accuracy, since it depends on the skill of the operator. Materials are batched consecutively, so invariably other equipment and men are kept waiting.

The kind of plant that uses decumulative type scales with fully loaded hoppers has a drawback in that no materials may be added to the hoppers while the batch is being delivered.

It is therefore one of the objects of this invention to provide a concrete batch plant overcoming the aforementioned problems by weighing materials while they are moving.

Another object is to provide a concrete batch plant that weighs the materials while they are moving using a self-contained pivoted belt scale such as shown in Patent No. 2,852,188, Model E, as shown in Catalogue S–60, of The Conveyor Co., 3260 East Slauson Ave., Los Angeles 58, California.

A further object is to provide a plant capable of batching more than 100 cubic yards per hour.

The use of a conveyor scale as a batching piece of equipment has heretofore been impossible because the scale must start empty and the exact amount of material that has been conveyed is not known until it has emptied itself.

Therefore, it is a further object to circumvent this difficulty by temporarily by-passing the conveyor scale and collecting the material in an auxiliary or pony hopper with a decumulative type beam scale. The required amount less the estimated amount the scale will deliver when emptying itself, plus a safety factor to be sure the total amount delivered is less than the required amount is run through or over the conveyor scale. The difference between the required amount and the delivered amount would then be added from the pony hopper which should not need refilling until after about eight or ten batch cycles.

The scale is equipped with a predetermined counter that would stop the feed conveyor when a pre-set amount had passed over the scale. The counter would record in 20 lb. increments and, since the total weight of conveyed material would very seldom be an even multiple of 20 lbs. a visual indicator with percentage converted directly into pounds would show the amount to be added to the counter quantity, variable from 1 pound to 19 pounds. This sum is the delivered amount that has to be subtracted from the required amount in order to know how much to discharge from the pony hopper.

The amount this batcher would produce depends on the size of the individual batches. Obviously it would produce more per hour when delivering 10 cubic yards batches than if it were delivering only 1 cubic yard batches. For batches of less than 1 cubic yard, only the pony hoppers would be used.

For specifications requiring that coarse aggregate be in two sizes and batched separately, a third supply hopper, conveyor, chute and scale arrangement may be positioned adjacent to supply hoppers 10 and 11 or an independent one-bin unit would be used in conjunction with the basic unit and would discharge directly onto conveyor 30 at some point beyond skirt 28. When not required for batching, this one-bin unit could be utilized to load trucks with sand, gravel, etc., so that they could haul their absolute maximum loads on the highway without guesswork and without the fear of penalty for being overloaded. For such usage an auxiliary conveyor would not be required.

For batches of 2 cubic yards or more, using only one size coarse aggregate, and of 4 cubic yards or more, using two sizes coarse aggregate, the results would be sufficiently accurate without adjusting for the last count, 1 lb. to 19 lbs. as explained above.

It is an object to provide an arrangement in a concrete batching machine to tempoararily or continuously by-pass a conveyor sensing device with all or a part of the feed material and collect such material in an auxiliary hopper with conventional type scale for the purpose of adding the difference between the desired amount and the conveyed amount.

Another object is to provide in a concrete batching plant an arrangement whereby a conveyor scale may be used as a piece of batching equipment.

Another object is to provide in a concrete batching plant an arrangement whereby a conveyor scale may be used to transfer an exact and pre-determined amount of material.

And it is a further object to provide in conjunction with the above concrete batching equipment an arrangement wherein the total amount of material transferred is determined before as well as after the conveyor has emptied itself and the operation is completed.

Further features and advantages of this invention will be seen from a detailed description of the drawings in which.

Figure 1:
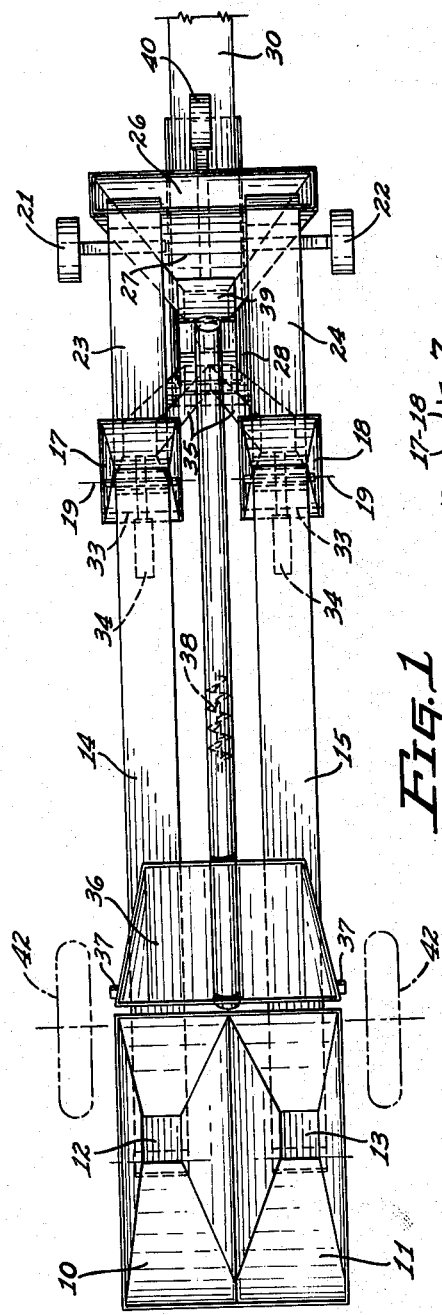
FIG. 1 is a plan view of a concrete batch plant incorporating the features of this invention.

As an example of one embodiment of this invention there is shown a concrete batch plant the essential elements of which are shown in the drawings, the usual framework structure to secure the basic elements together in operative position being not shown as it forms no part of the general concept of this invention. At the rear end of the batcher unit is provided a pair of supply hoppers 10 and 11, the hopper 10 arranged for example to supply sand and the hopper 11 for aggregate. At the bottom of the hoppers 10 and 11 are discharge openings 12 and 13 located closely adjacent the rear ends of the respective upwardly sloping belt conveyors 14 and 15. These conveyor belts operate in the direction indicated by the arrow 16 conveying material from the discharge openings of the hopper 10 and 11 and discharging the material into the swinging feed chutes 17 and 18 pivotally mounted to swing about the horizontal transverse axis 19.

Figure 2:
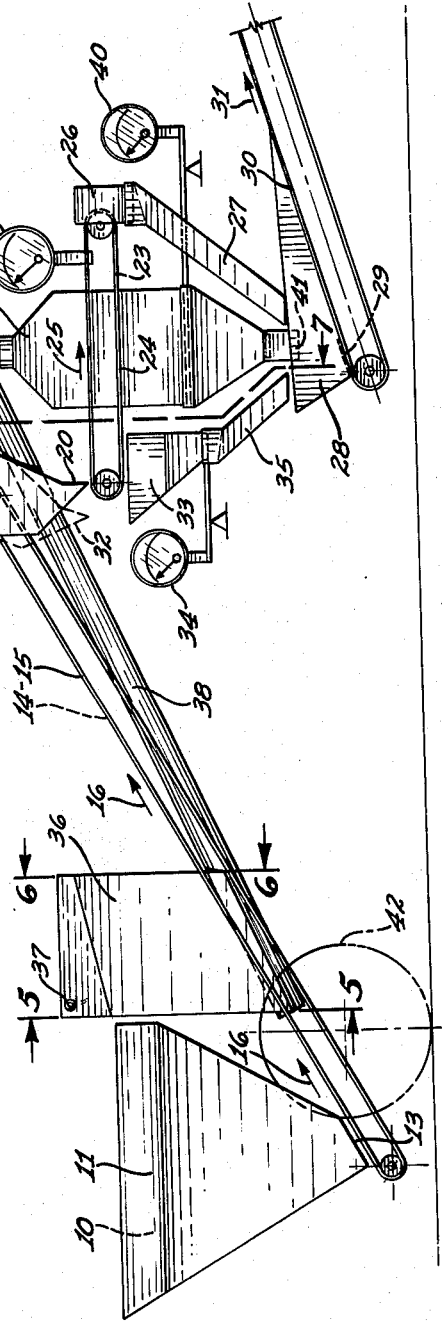
FIG. 2 is a side elevation of the concrete batch plant shown in FIG. 1.
Figure 3:
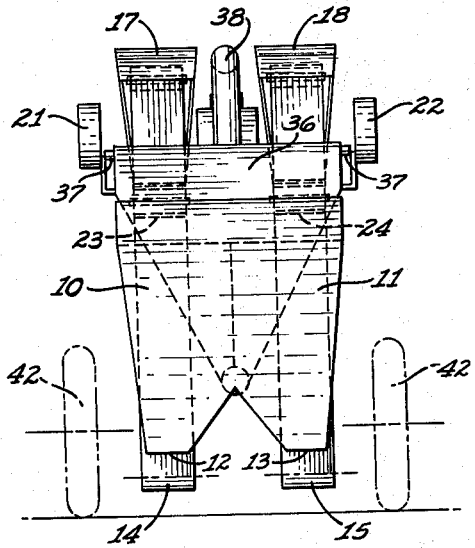
FIG. 3 is a rear end elevation of the concrete batch plant shown in FIGS. 1 and 2.
Figure 4:
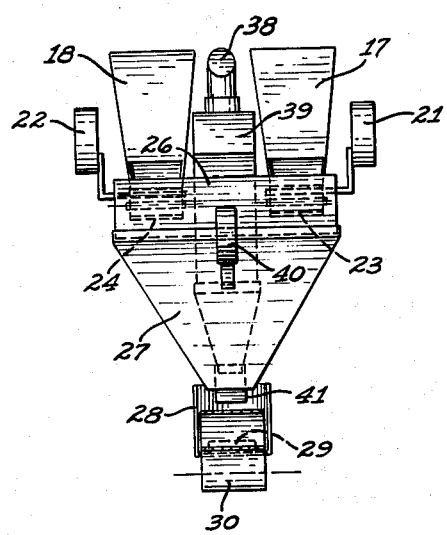
FIG. 4 is a front end elevation of the concrete batch plant shown in FIGS. 1 and 2.
Figure 5:
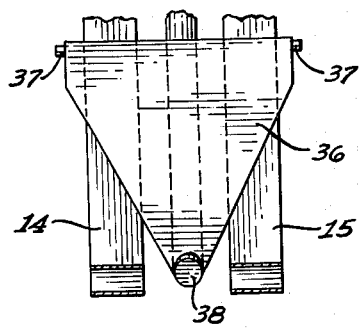
FIG. 5 is a transverse section on the line 5—5 of FIG. 2.
Figure 6:
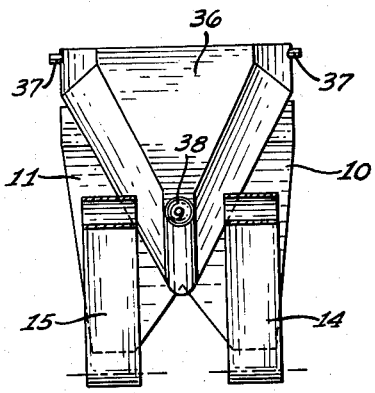
FIG. 6 is a transverse section on the line 6—6 of FIG. 2.
Figure 7:
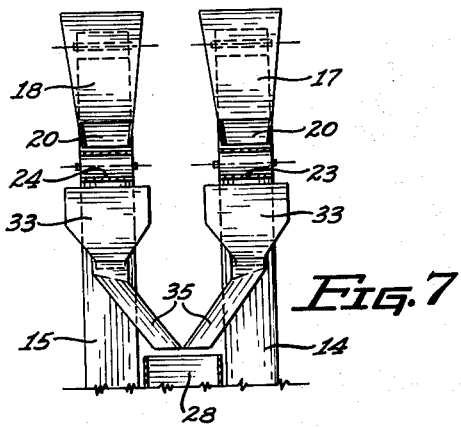
FIG. 7 is a transverse section on the line 7—7 of FIG. 1.

Discharge from the feed chutes 17 and 18, when in forwardly tipped position 20 shown in full line, FIG. 2, is deposited on the rear end of a self-contained sensing conveyor scales 21 and 22 such as shown in the aforementioned Patent 2,852,188 comprising the conveyor belts 23 and 24 operating in the direction indicated by the arrows 25 and discharging into the receiver 26 connected to the chute 27 in turn dumping into the discharge pan 28 having the discharge outlet 29 associated with the final distributing conveyor 30 operating in the direction indicated by the arrow 31 to deliver the batched material to a mixer truck for transportation to the job site. When the feed chutes are swung to rearward position 32 indicated by broken lines in FIG. 2, the material from the conveyors 14 and 15 is then discharged in the pony or auxiliary hoppers 33 having decumulative type beam scales 34, the hoppers 33 discharging into chutes 35 dumping into the discharge pan 28.

Conveyor 30 with its skirt or discharge pan 28 is an independent portable unit that may be positioned at any angle in a 180 degree arc from perpendicular right to perpendicular left of the center line of the batcher. Discharge pan 28 is the usual apron needed to confine the lateral movement of the materials as they are discharged from chutes 27 and 35 and sock 41 until they are carried away by conveyor 30. If desired, a dump truck or any other suitable common receiver may be utilized for the discharge pan 28 and conveyor 29 to accept the discharge from the chutes 27 and 35 and the sock 41.

Cement is supplied to the cement transfer bin 36 from the usual pressure tank trailer through the usual air conveyor hose connected at 37 to the cement transfer bin 36. A screw conveyor 38 removes cement from the bottom of the cement transfer bin 36 and discharges it into the top of the cement weigh bin 39 supported on a suitable scale 40 so that required amounts of cement may be discharged through the discharge sock 41 onto the conveyor 30 along with the measured amounts of sand and gravel from the bins 10 and 11.

In the operation of the apparatus just described, the tipping of the feed chutes 17 and 18 is done so as to temporarily or continuously by-pass the sensing conveyors 23 and 24 with all or a part of the material being fed from the hoppers 10 and 11 by the conveyors 14 and 15 and to collect such material in the auxiliary hopper with the scale 34 for the purpose of adding the difference between the desired amount and the sensed amount to the final material supplied to the conveyor belt 30. Thus, the conveyor scales 23–24 are used as part of the batching piece of equipment and are used to transfer an exact and predetermined amount of material wherein the total amount of material transferred is determined before as well as after the conveyor has emptied itself and the operation is completed.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A concrete batch plant comprising a batcher unit having in combination:
   (a) supply hoppers at the rear end of the batcher unit,
   (b) upwardly and forwardly sloping belt conveyors, one for each hopper,
   (c) discharge openings at the bottom of each hopper located closely adjacent the rear ends of said respective belt conveyors,
   (d) a swinging feed chute located at the discharge ends of each of said belt conveyors adapted to receive the discharge from said belt conveyors,
   (e) self-contained sensing conveyor scales, one for each swinging feed chute, adapted to receive discharge from said swinging feed chutes when said feed chute discharge outlets are in forwardly tipped position,
   (f) a discharge pan adapted to receive discharge from said sensing conveyor scales,
   (g) an auxiliary pony hopper, one for each of said swinging feed chutes, adapted to receive discharge from said swinging feed chutes when said feed chute discharge outlets are swung to a rearward position and to discharge into said discharge pan,
   (h) and scale means associated with each of said auxiliary hoppers.

2. A concrete batch plant comprising a batcher unit having in combination:
   (a) supply hoppers at the rear end of the batcher unit,
   (b) upwardly and forwardly sloping belt conveyors, one for each hopper,
   (c) discharge openings at the bottom of each hopper located closely adjacent the rear ends of said respective belt conveyors,
   (d) a swinging feed chute located at the discharge ends of each of said belt conveyors adapted to receive the discharge from said belt conveyors,
   (e) self-contained sensing conveyor scales, one for each swinging feed chute, adapted to receive discharge from said swinging feed chutes when said feed chute discharge outlets are in forwardly tipped position,
   (f) a discharge pan adapted to receive discharge from said sensing conveyor scales,
   (g) an auxiliary pony hopper, one for each of said swinging feed chutes, adapted to receive discharge from said swinging feed chutes when said feed chute discharge outlets are swung to a rearward position and to discharge into said discharge pan,
   (h) scale means associated with each of said auxiliary hoppers,
   (i) a cement transfer bin,
   (j) a screw conveyor adapted to receive cement from said transfer bin,
   (k) and a cement weight bin,
   (l) and a scale operatively supporting said cement weigh bin so that required amounts of cement may be discharged into said discharge pan onto said distributing conveyor.

3. A concrete batch plant comprising a batcher unit having in combination:
   (a) supply hoppers at the rear end of the batcher unit,
   (b) upwardly and forwardly sloping belt conveyors, one for each hopper,
   (c) discharge openings at the bottom of each hopper located closely adjacent the rear ends of said respective belt conveyors,
   (d) a swinging feed chute located at the discharge ends of each of said belt conveyors adapted to receive the discharge from said belt conveyors, (e) self-contained sensing conveyor scales, one for each swinging feed chute, adapted to receive discharge from said swinging feed chutes when said feed chute discharge outlets are in forwardly tipped position, (f) a discharge pan adapted to receive discharge from said sensing conveyor scales, (g) an auxiliary pony hopper, one for each of said swinging feed chutes, adapted to receive discharge from said swinging feed chutes when said feed chute discharge outlets are swung to a rearward position and to discharge into said discharge pan, (h) and a conveyor scale means used as a concrete batching piece of equipment.

References Cited by the Examiner

UNITED STATES PATENTS

| | | | |
|---|---|---|---|
| 2,285,765 | 6/42 | Carswell | 214—2 X |
| 2,509,836 | 5/50 | Muskat | 198—66 |
| 2,587,531 | 2/52 | Saxe | 214—2 X |
| 2,967,629 | 1/61 | Long | 214—2 |
| 3,017,039 | 1/62 | Schwing | 214—2 |
| 3,031,064 | 4/62 | Kline | 198—66 |
| 3,074,534 | 1/63 | Thiele | 198—66 |
| 3,092,264 | 6/63 | Milek | 214—2 |

GERALD M. FORLENZA, *Primary Examiner.*

MORRIS TEMIN, *Examiner.*